United States Patent
Moon et al.

(10) Patent No.: US 8,485,540 B2
(45) Date of Patent: Jul. 16, 2013

(54) COUPLED TORSION BEAM AXLE WITH SWING JOINT

(75) Inventors: Hakyung Moon, Hwaseong-si (KR);
Sungil Kim, Hwaseong-si (KR);
Hyoseok Kim, Suwon-si (KR);
Heekweon Jang, Hwaseong-si (KR);
Byungrim Lee, Seongnam-si (KR);
Ywanje Jo, Daegu (KR); Jaeho Kim,
Gyeongju-si (KR)

(73) Assignees: Hyundai Motor Company, Seoul (KR);
Hwashin Co., Yeongcheon-Si (KR)

( * ) Notice: Subject to any disclaimer, the term of this patent is extended or adjusted under 35 U.S.C. 154(b) by 0 days.

(21) Appl. No.: 13/310,369

(22) Filed: Dec. 2, 2011

(65) Prior Publication Data

US 2013/0056947 A1    Mar. 7, 2013

(30) Foreign Application Priority Data

Sep. 2, 2011 (KR) .................. 10-2011-0088966

(51) Int. Cl.
*B60G 3/12* (2006.01)

(52) U.S. Cl.
USPC ......... 280/124.128; 280/86.758; 280/124.166

(58) Field of Classification Search
USPC .......... 280/5.52, 5.521, 5.522, 5.524, 86.751, 280/86.758, 124.128, 124.166
See application file for complete search history.

(56) References Cited

U.S. PATENT DOCUMENTS

| 7,516,965 | B2 |  | 4/2009 | Horiuchi |
| 8,220,808 | B2 | * | 7/2012 | Kim ....................... 280/124.107 |
| 2006/0091721 | A1 |  | 5/2006 | Han et al. |
| 2006/0138740 | A1 | * | 6/2006 | Nam ....................... 280/86.756 |
| 2006/0220339 | A1 | * | 10/2006 | Kusaka et al. ......... 280/124.166 |
| 2010/0052271 | A1 | * | 3/2010 | Vaxelaire et al. .......... 280/5.524 |

FOREIGN PATENT DOCUMENTS

| JP | 2002-12015 A | 1/2002 |
| JP | 2002-248919 A | 9/2002 |
| JP | 2008-55921 A | 3/2008 |
| KR | 10-2006-0053723 A | 5/2006 |
| KR | 10-2007-0037089 A | 4/2007 |
| KR | 10-0901598 B1 | 6/2009 |
| KR | 10-1003812 B1 | 12/2010 |

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

A coupled torsion beam axle (CTBA) apparatus may include a torsion beam, a trailing arm provided at both ends of the torsion beam, and a wheel mount bracket provided at an end of the trailing arm and being adapted to mount a rear wheel thereon, wherein a front end of the wheel mount bracket in a traveling direction of a vehicle may be hinge-connected to a front portion of the trailing arm with a rubber bush interposed therebetween, and a swing joint may be further provided between a rear end of the wheel mount bracket and a rear portion of the trailing arm and pivotally connects the rear end of the wheel mount bracket to a rear end of the trailing arm.

5 Claims, 8 Drawing Sheets

COUPLED TORSION BEAM AXLE WITH SWING JOINT

CROSS-REFERENCE TO RELATED APPLICATIONS

The present application claims priority to Korean Patent Application Number 10-2011-0088966 filed Sep. 2, 2011, the entire contents of which application is incorporated herein for all purposes by this reference.

BACKGROUND OF THE INVENTION

1. Field of the Invention

The present invention relates to a coupled torsion beam axle (CTBA) which is a kind of suspension of a vehicle, and more particularly, to a CTBA having a swing joint, which changes the geometric characteristic of the CTBA using a swing joint, thereby improving stability during steering or braking.

2. Description of Related Art

A CTBA which is usually mounted as a suspension in a small vehicle has a simpler structure and a smaller number of parts than other suspensions, and may be manufactured at a smaller weight than other suspensions.

FIGS. 1 and 2 schematically illustrate the structure of a CTBA according to the related art. As illustrated in FIGS. 1 and 2, the CTBA includes a torsion beam 111 provided in the widthwise direction of a vehicle, a trailing arm 112 provided at both ends of torsion beam 111, and a wheel mount bracket 114 having a rear wheel RW mounted at an end of trailing arm 112.

The CTBA according to the related art has a structural characteristic that the rear wheel is toed out during steering or braking, thereby reducing steering stability or braking stability.

As illustrated in FIG. 1, when the vehicle is steered toward the right side of FIG. 1 as indicated by an arrow, the left and right rear wheels are steered toward the right side, and particularly, the outer rear wheel is less steered than the traveling direction of the vehicle. Therefore, the rear wheel is toed out.

During braking as illustrated in FIG. 2, the car body tends to continuously advance due to the influence of inertia, compared with the rear wheels braked by a braking force. Therefore, the torsion beam is minutely deformed in a convex shape toward the traveling direction of the vehicle. Accordingly, the rear wheels are opened toward outside and toed out, which may hurt the braking stability.

Meanwhile, in order to prevent the toe out of the rear wheels which inevitably occurs in the CTBA, a variety of methods have been proposed.

For example, Korean Patent Application Laid-Open No. 10-2006-0006797 has disclosed technology for controlling the toe values of rear wheels. In the technology, an actuator and a link member capable of adjusting the tow values of the rear wheels are provided in a CTBA, and a controller operates the actuator according to a traveling condition and controls the toe values of the rear wheels.

However, the technology for adjusting the toe values of the rear wheels through electronic control requires a high cost. Therefore, the production cost of the vehicle increases, and the construction thereof becomes complex.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coupled torsion beam axle with a swing joint, which changes the geometric characteristic of a wheel mount bracket during steering or braking such that rear wheels are toed in, thereby improving stability.

In an aspect of the present invention, a coupled torsion beam axle (CTBA) apparatus may include a torsion beam, a trailing arm provided at both ends of the torsion beam, and a wheel mount bracket provided at an end of the trailing arm and being adapted to mount a rear wheel thereon, wherein a front end of the wheel mount bracket in a traveling direction of a vehicle is hinge-connected to a front portion of the trailing arm with a rubber bush interposed therebetween, and a swing joint is further provided between a rear end of the wheel mount bracket and a rear portion of the trailing arm and pivotally connects the rear end of the wheel mount bracket to a rear end of the trailing arm.

The trailing arm may include an end bracket formed at the end thereof, the end bracket including a front connection portion and a rear connection portion which are formed at front and rear portions thereof, respectively, so as to protrude to the outside of the torsion beam, the front end of the wheel mount bracket is pin-joint connected to the front connection portion through a connection pin, such that the bush is interposed between the front end of the wheel mount bracket and the connection pin, the rear end of the wheel mount bracket is hinge-connected to one end of the swing joint, and the rear connection portion of the end bracket is hinge-connected to the other end of the swing joint.

When the vehicle is turned to apply a side force, the front end of the wheel mount bracket having the external rear wheel mounted thereon is moved to the inside of the vehicle, such that the rear wheel is toed in.

When the vehicle is braked to apply a braking force, the front end of the wheel mount bracket is moved to the inside of the vehicle and the rear end of the wheel mount bracket is moved to the outside of the vehicle, such that the rear wheel is toed in.

The end bracket may include a swing joint stopper which may have a front end positioned adjacent to the inside of the swing joint between the front connection portion and the rear connection portion and is formed to protrude toward the inside of the rear connection portion.

The swing joint is connected to distal portions of the rear end of the wheel mount bracket.

The coupled torsion beam axle with a swing joint according to the exemplary embodiment of the present invention has a simple structure which compensates for the geometric values of the CTBA during steering or braking, such that the rear wheels are toed in.

That is, when a side force is applied to the rear wheels during steering, the front end of the wheel mount bracket is moved to the inside, such that the rear wheels receiving the side force are toed in. During braking, while the wheel mount bracket is pushed to the rear side, the front portion of the wheel mount bracket is moved to the inside, and the rear portion of the wheel mount bracket is moved to the outside, such that the rear wheels are toed in.

As described above, the geometric values during steering or braking may be compensated so that the rear wheels are toed. Therefore, it is possible to improve steering stability and braking stability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
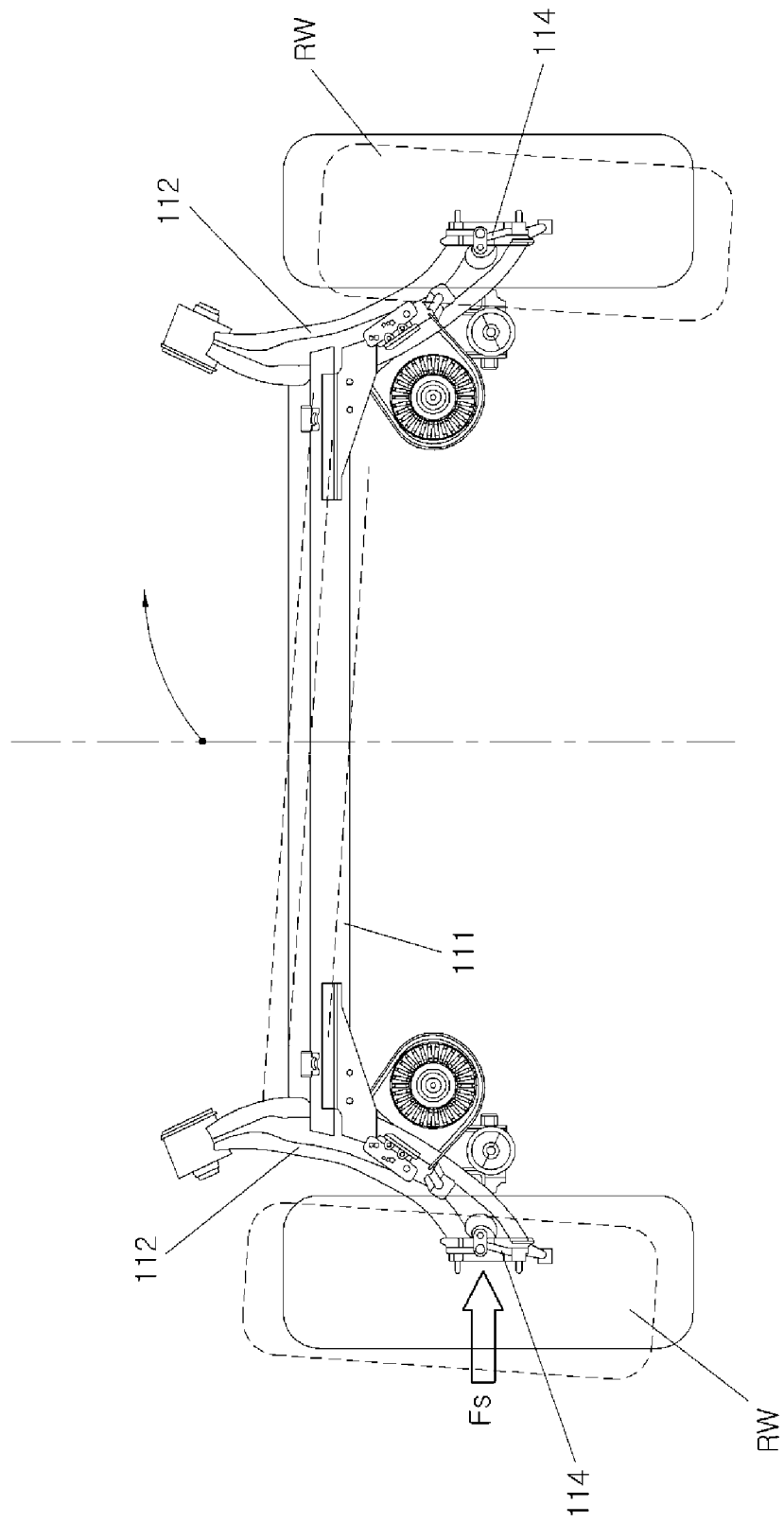
FIG. 1 is a plan view of a CTBA according to the related art, illustrating a state in which rear wheels are toed out during steering.
Figure 2:
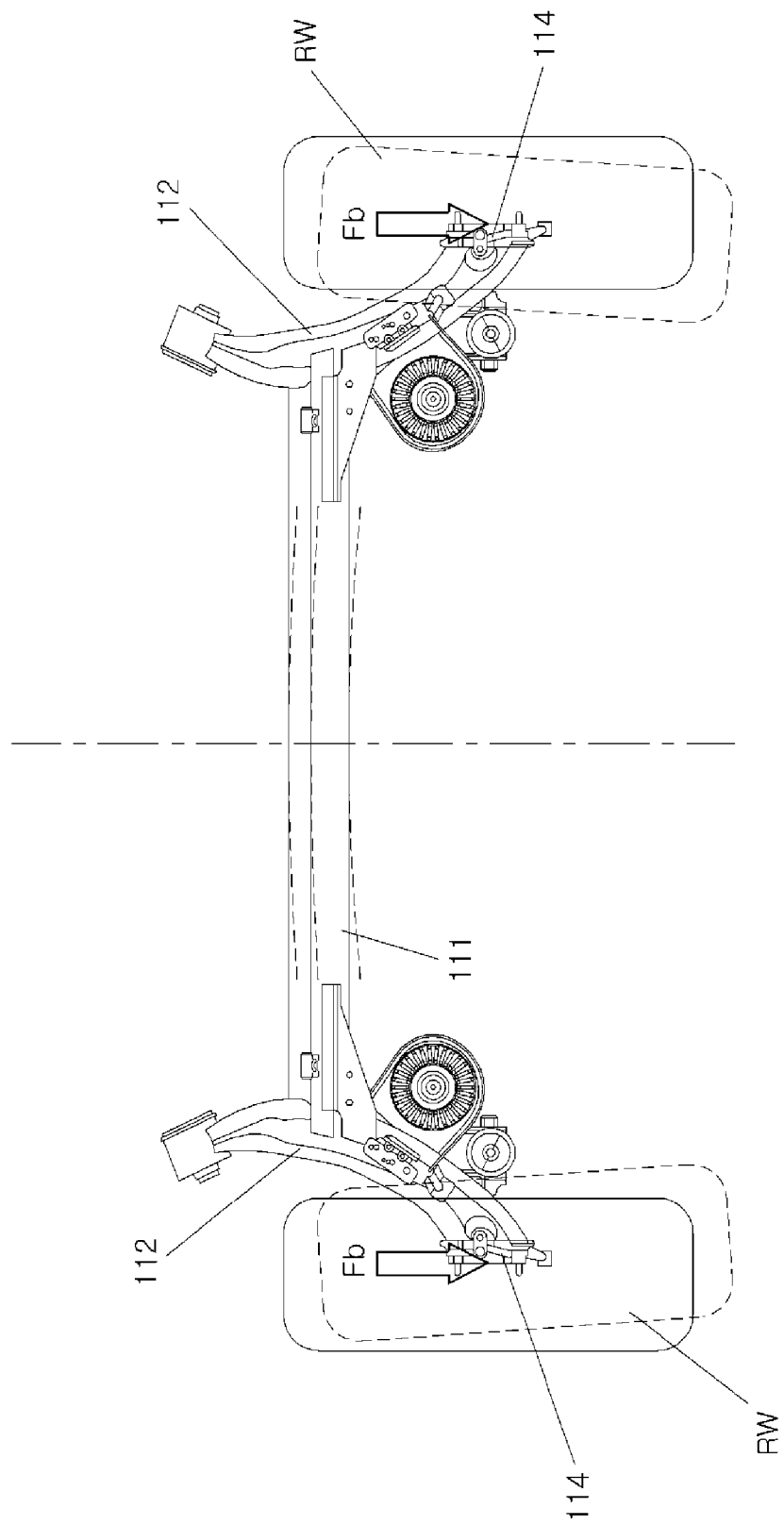
FIG. 2 is a plan view of the CTBA according to the related art, illustrating a state in which rear wheels are toed out during braking.
Figure 3:
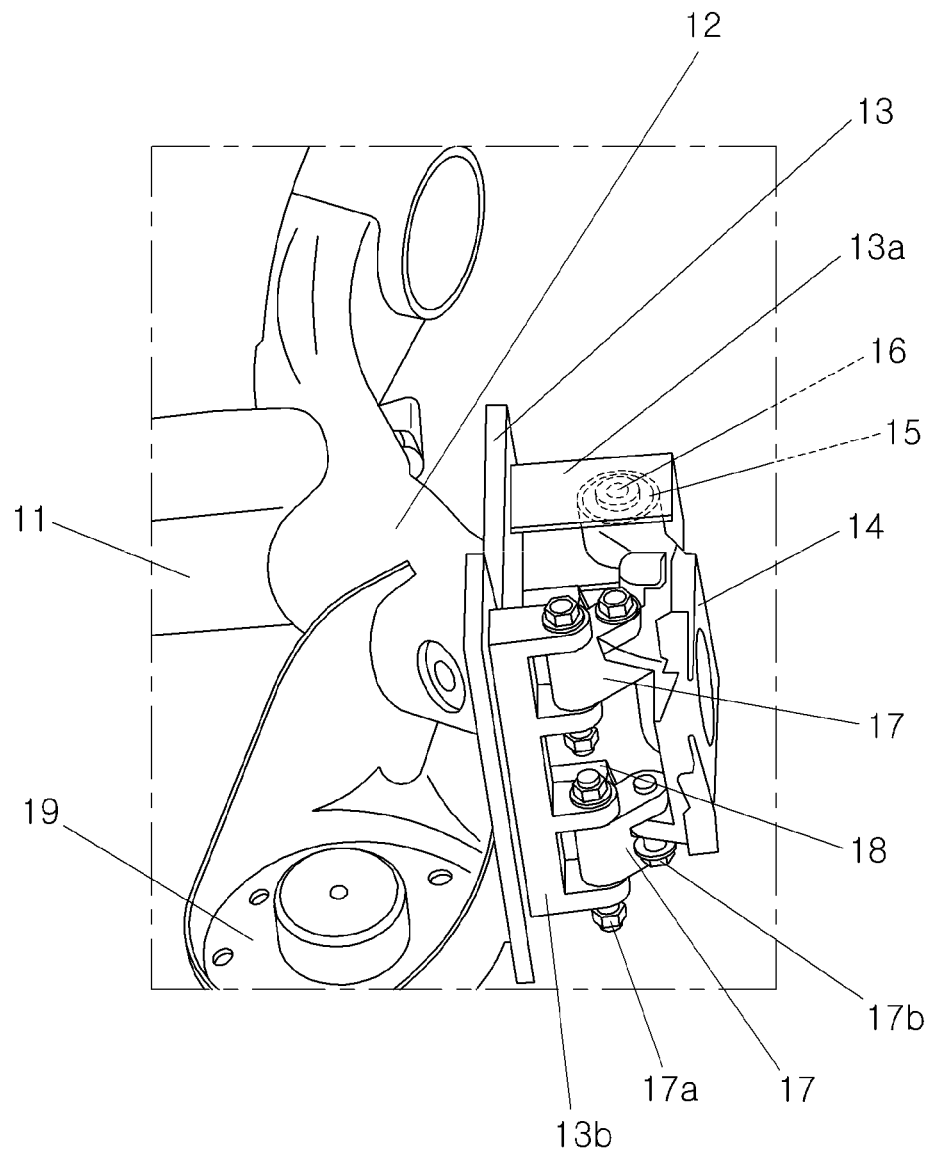
FIG. 3 is an expanded perspective view of a CTBA having a swing joint according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a coupled torsion beam axle with a swing joint according to an exemplary embodiment of the present invention will be described in detail with reference to the accompanying drawings.

The coupled torsion beam axle with a swing joint according to the exemplary embodiment of the present invention includes a wheel mount bracket 14 and a swing joint 17. The front end of wheel mount bracket 14 in the traveling direction of a vehicle is hinge-connected to the front of a trailing arm 12 with a rubber bush 15 interposed therebetween, and swing joint 17 is provided to hinge-connect the rear end of wheel mount bracket 14 to the rear portion of trailing arm 12.

An end bracket 13 is provided at an end of trailing arm 12 coupled to both ends of a torsion beam 11. End bracket 13 is provided in a plate type at the end of trailing arm 12 so as to be easily coupled to a component which will be described below. End bracket 13 is provided in parallel to the traveling direction of the vehicle.

End bracket 13 includes a front connection portion 13a and a rear connection portion 13b which are formed in the front and rear thereof so to extend to the outside, in order to hinge-connect wheel mount bracket 14 and swing joint 17 which will be described below. Wheel mount bracket 14 and swing joint 17 are coupled to end bracket 13 through front connection portion 13a and rear connection portion 13b.

Wheel mount bracket 14 is provided at the end of trailing arm 12 so as to be mounted in a rear wheel of the vehicle. Wheel mount bracket 14 is hinge-connected to the end of trailing arm 12, that is, end bracket 13.

In this case, the front end of wheel mount bracket 14 is directly hinge-connected to end bracket 13 through front connection portion 13a, and the rear end of wheel mount bracket 14 is connected to end bracket 13 through swing joint 17 which will be described below.

The structure of the portion where wheel mount bracket 14 and front connection portion 13a of end bracket 13 are hinge-connected may be described as follows. Wheel mount bracket 14 is hinge-connected to front connection portion 13a of end bracket 13 by a connection pin 16 passing through end connection portion 13a of end bracket 13 and wheel mount bracket 14. In this case, between the front end of wheel mount bracket 14 and connection pin 16, rubber bush 15 is provided.

When an external force such as a side force Fs or braking force Fb is applied to wheel mount bracket 14 in a state in which bush 15 is interposed between wheel mount bracket 14 and connection pin 16, the front end of wheel mount bracket 14 is moved within such a range that bush 15 is compressed. When the external force is removed, wheel mount bracket 14 may return to the original position.

Both ends of swing joint 17 are pin-joint connected to rear connection portion 13b of end bracket 13 and the rear end of wheel mount bracket 14 through a first swing joint pin 17a and a second swing joint pin 17b, respectively. Swing joint 17 connects the rear end of wheel mount bracket 14 to end bracket 13 and forms a link structure such that wheel mount bracket 14 is moved when the vehicle is steered or braked. That is, when wheel mount bracket 14 is moved by steering or braking, wheel mount bracket 14 may be turned within a minute range such that swing joint 17 supports the rear end of wheel mount bracket 14.

Therefore, the rear end of wheel mount bracket 14 is connected to end bracket 13 through two rotating shafts of swing joint 17, that is, first swing joint pin 17a and second swing joint pin 17b, such that the rear wheels are toed in by the deformation of the geometric shapes of wheel mount bracket 14 and end bracket 113 when the vehicle is steered or braked.

In this case, two upper and lower swing joints 17 may be provided so as to be connected to the upper and lower portions of the rear end of wheel mount bracket 14, respectively.

A swing joint stopper 18 is formed to protrude from the surface of end bracket 13, and serves to prevent swing joint 17 from being internally rotated about first swing joint pin 17a. Swing joint stopper 18 is formed on end bracket 13 so as to protrude inside rear connection portion 13a such that the front end of swing joint stopper 18 is positioned adjacent to the inside of swing joint 17. Since the front end of swing joint stopper 18 is positioned adjacent to swing joint 17, swing joint stopper 18 prevents swing joint 17 from being internally rotated about first swing joint pin 17a. When swing joint 17 is excessively internally rotated about first swing join pin 17a, the rear wheels RW may be toed out. Swing joint stopper 18 supports swing joint 17 to prevent the rear wheels RW from being toed out.

Reference numeral 19 represents a spring seat which receives a spring.

Hereinafter, the operation of the CTBA having a swing joint according to the exemplary embodiment of the present invention will be described with reference to the accompanying drawings.

Figure 5:
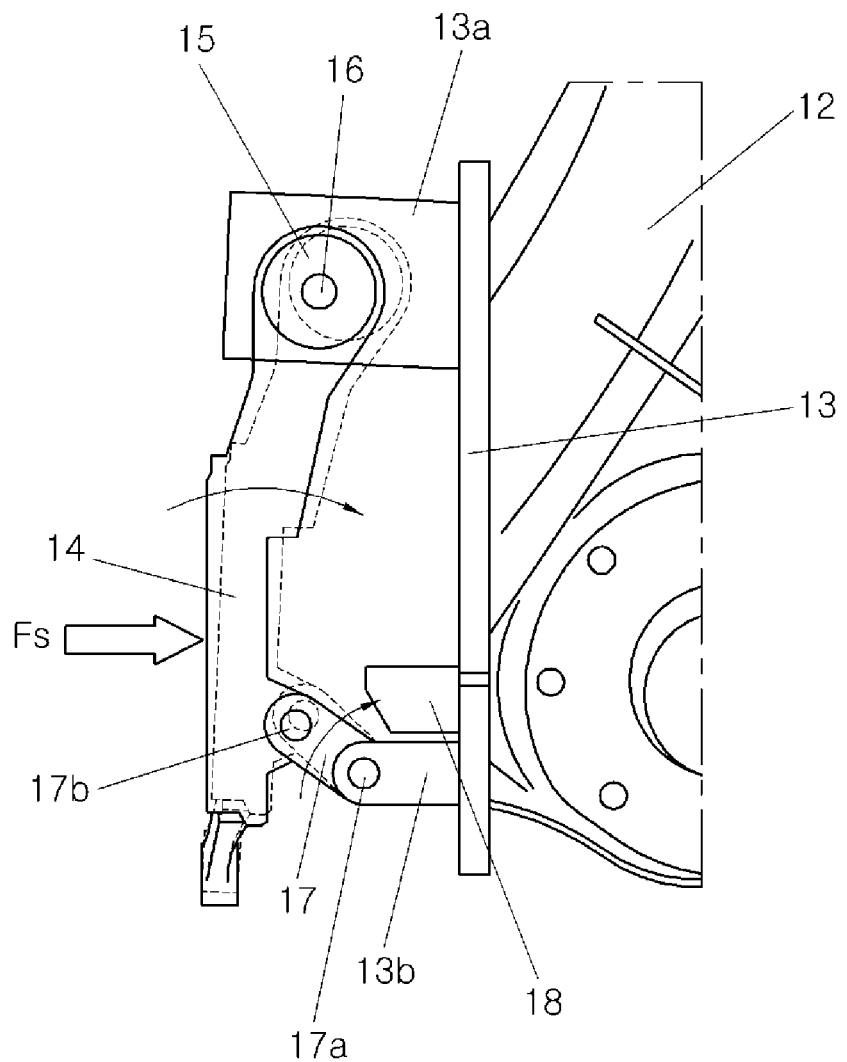
FIGS. 5 and 6 are a plan view of the CTBA having a swing joint according to the exemplary embodiment of the present invention and a diagram illustrating a state in which rear wheels are toed in during steering.
Figure 6:
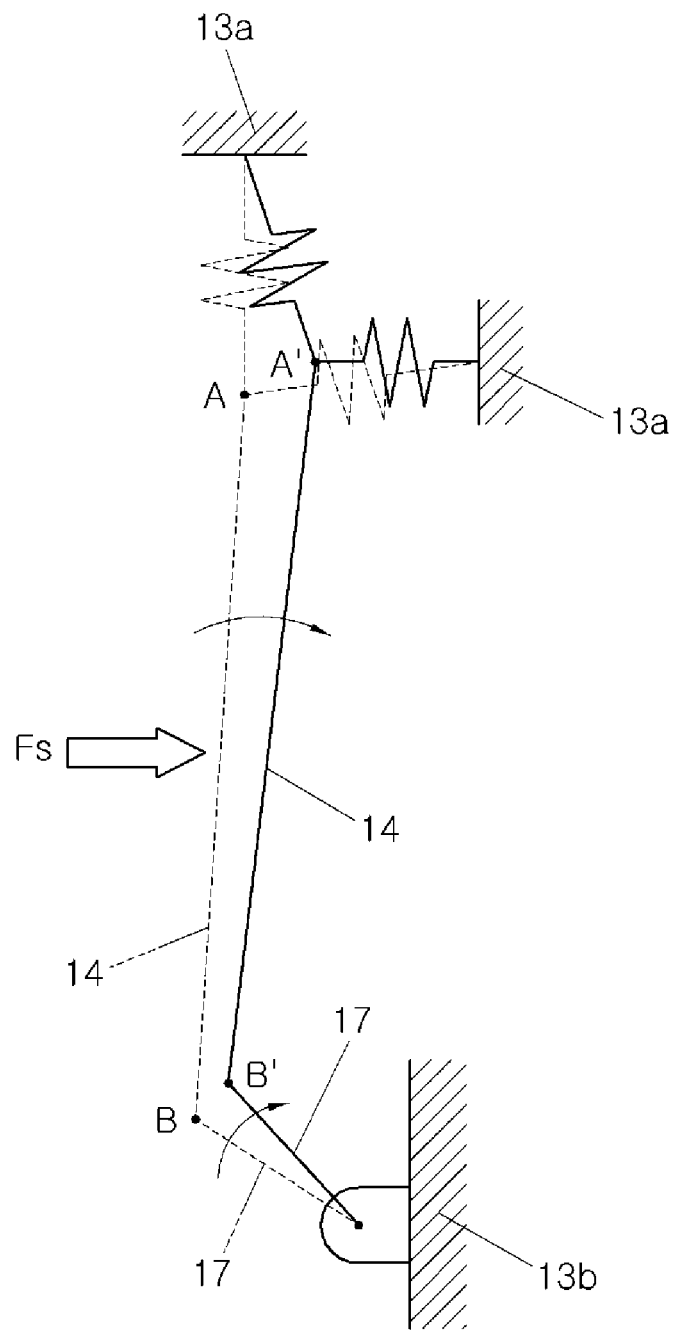

FIGS. 5 and 6 illustrate a case in which the vehicle is steered. As illustrated in FIGS. 5 and 6, the front end of wheel mount bracket 14 is moved to the inside, such that the rear wheel is toed in.

During steering of the vehicle, a side force Fs is applied in a side direction of the external rear wheel RW. When the side force Fs is applied to the rear wheel RW from outside, the front of wheel mount bracket 14 is moved to the inside, and the rear wheel RW is toed in. That is, when the side force Fs is applied to wheel mount bracket 14 in a state in which the front end of wheel mount bracket 14 is hinge-connected by bush 15, one side of bush 15 is compressed by the side force Fs that is an external force. Further, a connection point A between the front end of wheel mount bracket 14 and front connection portion 13a moves to a point A', and a connection point B between the rear end of wheel mount bracket 14 and swing joint 17 moves to a point B'.

Figure 4:
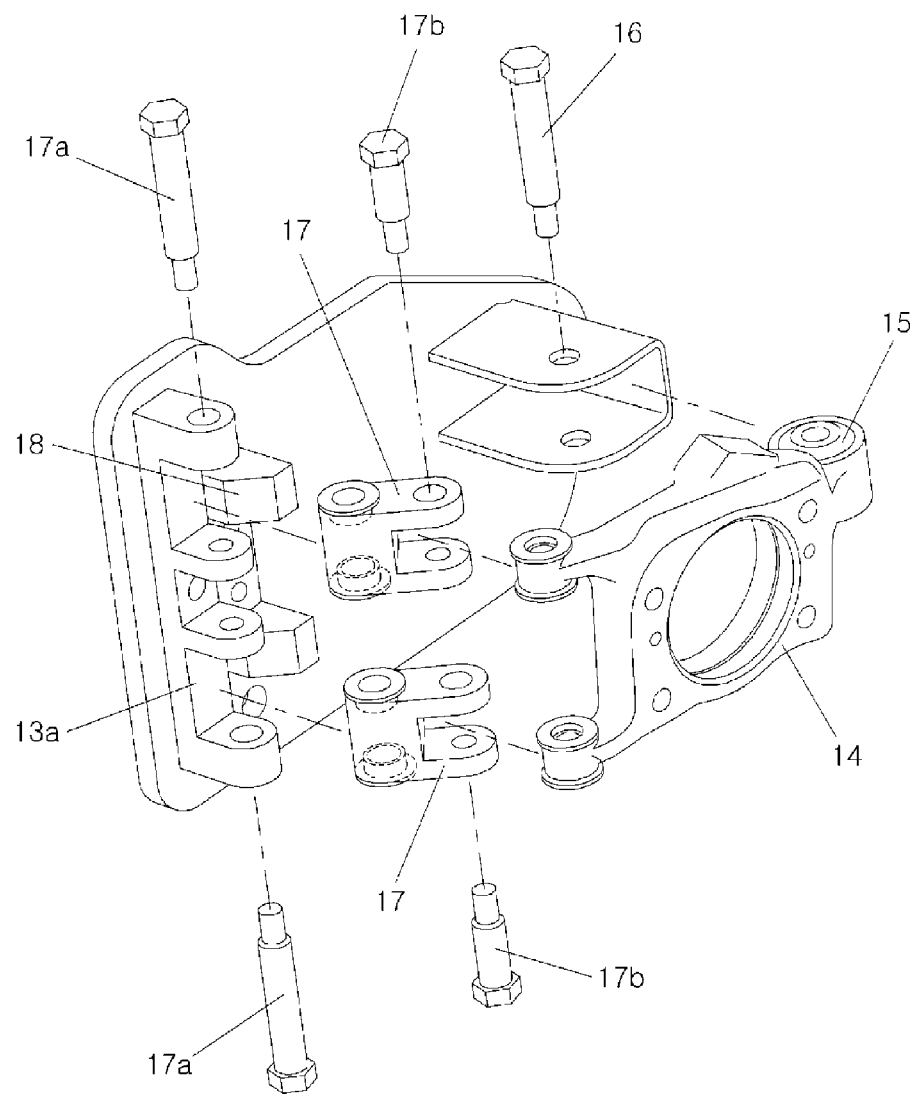
FIG. 4 is an exploded perspective view of the CTBA of FIG. 3.

Accordingly, when the side force Fs is applied to the rear wheel RW by steering, the front end of wheel mount bracket 14 having the external rear wheel mounted thereon is moved to the inside, and swing joint 17 is swung by the movement of wheel mount bracket 14, as illustrated in FIGS. 4 and 5. Therefore, the geometric shape of the CTBA is changed, and the rear wheel is toed in during steering. Accordingly, the steering stability of the vehicle is improved.

Figure 7:
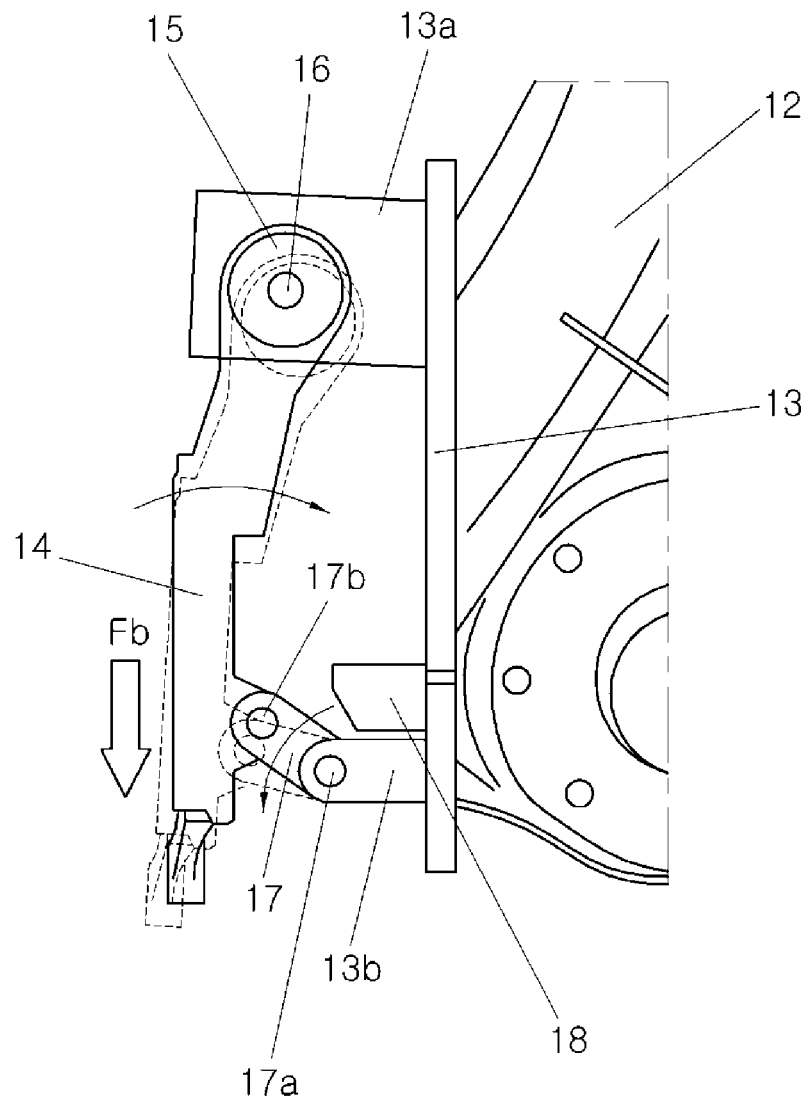
FIGS. 7 and 8 are a plan view of the CTBA having a swing joint according to the exemplary embodiment of the present invention and a diagram illustrating a state in which rear wheels are toed in during braking.
Figure 8:
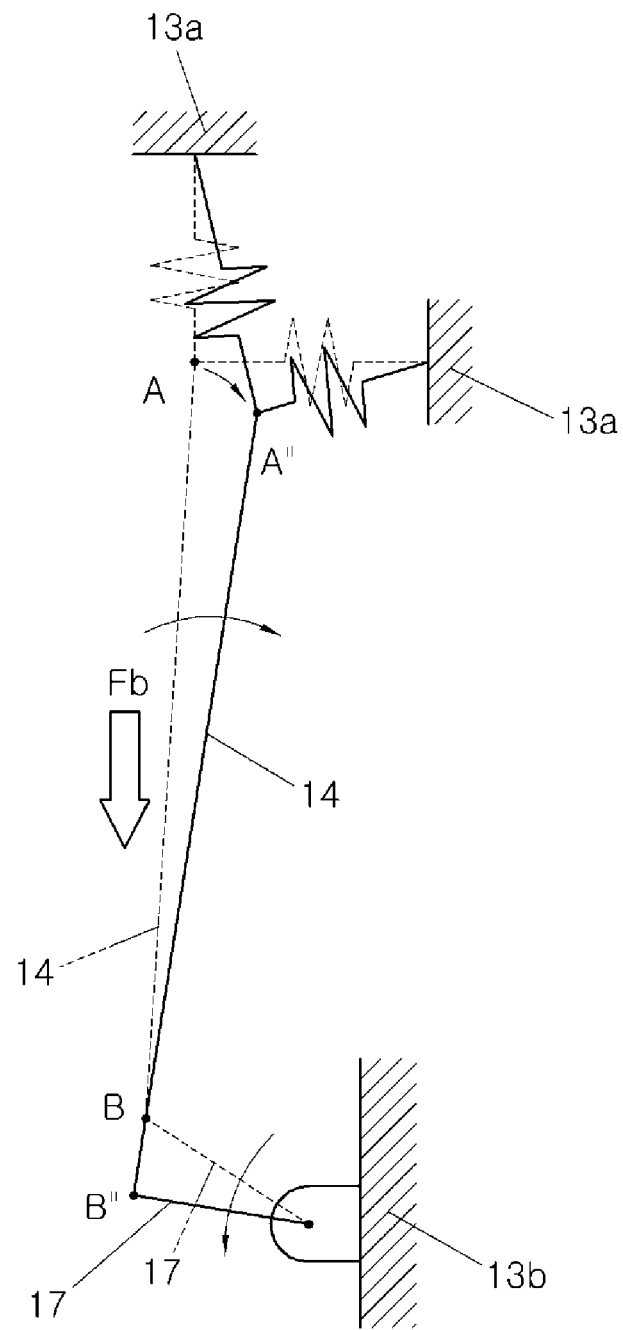

FIGS. 7 and 8 illustrate a process in which both wheel mount brackets 14 coupled to the rear wheels RW are moved from the original position to the rear side, when the vehicle is braked. As illustrated in FIGS. 7 and 8, while the front portions of respective wheel mount brackets 14 are moved to the inside and the rear portions thereof are moved to the outside, wheel mount brackets 14 as a whole are moved toward the inside such that the rear wheels RW are toed in.

When the vehicle is stopped or braked to pass through a speed bump, a braking force Fb facing the rear of the vehicle is applied to the rear wheels RW.

When the braking force Fb is applied to wheel mount bracket 14, the front of wheel mount bracket 14 is pushed to the rear side while bush 15 is compressed, and the connection portion between swing joint 17 and wheel mount bracket 14 is rotated in the rear direction of the vehicle, together with wheel mount bracket 14. While swing joint 17 is rotated, the rear portion of wheel mount bracket 14 is pushed to the outside of the vehicle. Furthermore, the front portion of wheel mount bracket 14 is relatively directed to the inside of the vehicle, and the rear portion of wheel mount bracket 14 is relatively directed to the outside of the vehicle. That is, while the geometric shape is changed in such a manner that the connection point A between wheel mount bracket 14 and front connection portion 13a moves to a point A" and the connection point B between wheel mount bracket 14 and swing joint 17 moves to a point B", the front portion of wheel mount bracket 14 is moved to the inside, and the rear portion of wheel mount bracket 14 is moved to the outside.

Therefore, during braking, as the rear portion of wheel mount bracket 14 is moved to the outside, the rear wheels are toed in. Accordingly, it is possible to improve the braking stability and the ride feeling when the vehicle is braked or passes through a speed bump.

For convenience in explanation and accurate definition in the appended claims, the terms "upper", "lower", "inner", "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle (CTBA) apparatus comprising:
    a torsion beam;
    a trailing arm provided at both ends of the torsion beam; and
    a wheel mount bracket provided at an end of the trailing arm and being adapted to mount a rear wheel thereon;
    wherein a front end of the wheel mount bracket in a traveling direction of a vehicle is hinge-connected to a front portion of the trailing arm with a rubber bush interposed therebetween,
    wherein a swing joint is further provided between a rear end of the wheel mount bracket and a rear portion of the trailing arm and pivotally connects the rear end of the wheel mount bracket to a rear end of the trailing arm,
    wherein the trailing arm includes an end bracket formed at the end thereof, the end bracket including a front connection portion and a rear connection portion which are formed at front and rear portions thereof, respectively, so as to protrude to an outside of the torsion beam,
    wherein the front end of the wheel mount bracket is pin-joint connected to the front connection portion through a connection pin, such that the bush is interposed between the front end of the wheel mount bracket and the connection pin,
    wherein the rear end of the wheel mount bracket is hinge-connected to one end of the swing joint, and
    wherein the rear connection portion of the end bracket is hinge-connected to the other end of the swing joint.

2. The CTBA apparatus as defined in claim 1, wherein, when the vehicle is turned to apply a side force,
    the front end of the wheel mount bracket having an external rear wheel mounted thereon is moved to the inside of the vehicle, such that the rear wheel is toed in.

3. The CTBA apparatus as defined in claim 1, wherein, when the vehicle is braked to apply a braking force,
    the front end of the wheel mount bracket is moved to the inside of the vehicle and the rear end of the wheel mount bracket is moved to the outside of the vehicle, such that the rear wheel is toed in.

4. The CTBA apparatus as defined in claim 1, wherein the end bracket includes a swing joint stopper which has a front end positioned adjacent to the inside of the swing joint between the front connection portion and the rear connection portion and is formed to protrude toward the inside of the rear connection portion.

5. The CTBA apparatus as defined in claim 1, wherein the swing joint is connected to distal portions of the rear end of the wheel mount bracket.

* * * * *